Nov. 17, 1931.   F. R. PETERS   1,832,137
LOCOMOTIVE BOOSTER
Filed June 20, 1929   2 Sheets-Sheet 1

INVENTOR
Frank R. Peters
BY Synnestvedt + Lechner
ATTORNEYS

Nov. 17, 1931.   F. R. PETERS   1,832,137
LOCOMOTIVE BOOSTER
Filed June 20, 1929    2 Sheets-Sheet 2
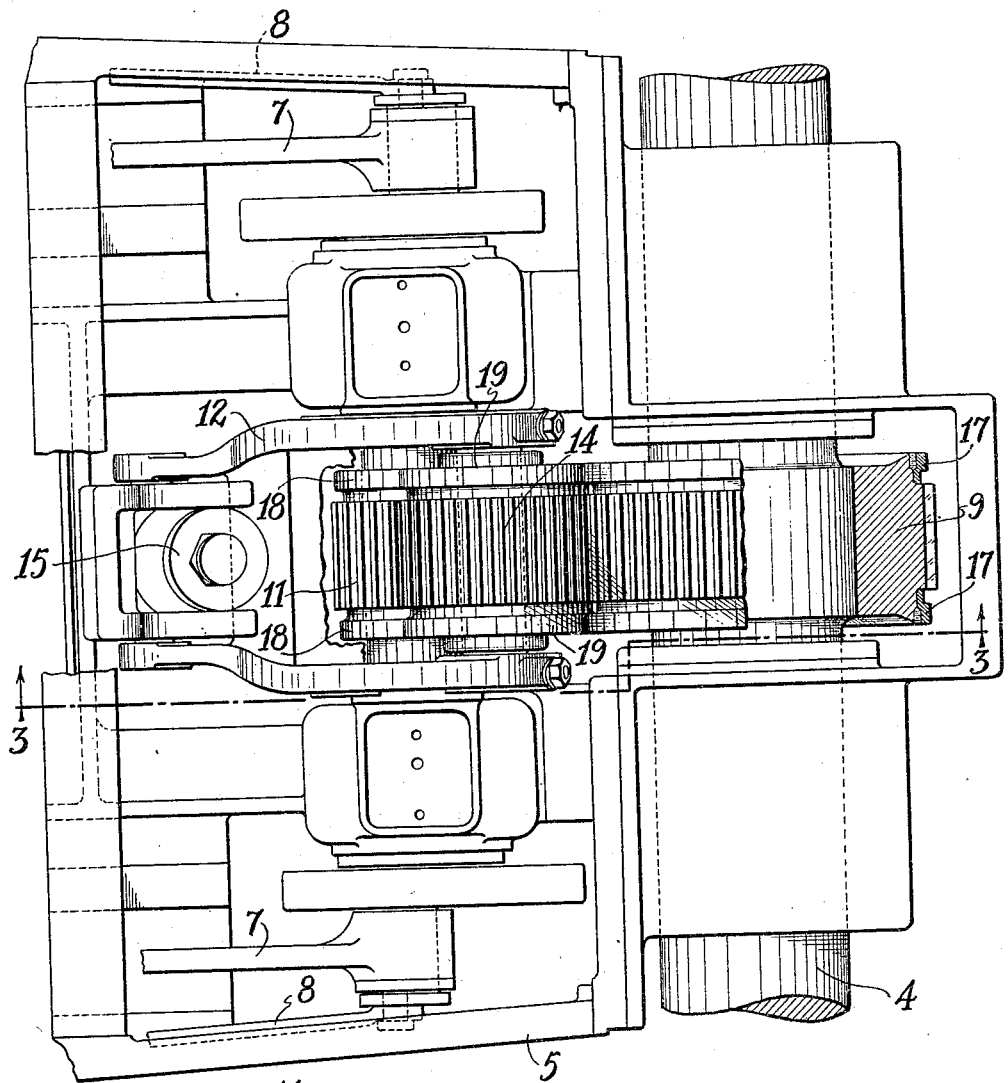
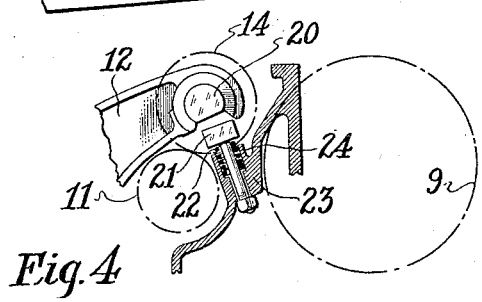

Patented Nov. 17, 1931

1,832,137

UNITED STATES PATENT OFFICE

FRANK RICHARD PETERS, OF NEW YORK, N. Y., ASSIGNOR TO FRANKLIN RAILWAY SUPPLY COMPANY, OF NEW YORK, N. Y., A CORPORATION OF DELAWARE

LOCOMOTIVE BOOSTER

Application filed June 20, 1929. Serial No. 372,316.

This invention relates to locomotive boosters, more particularly to the driving gearing therefor.

Generally considered some of the more important objects of the invention are the provision of means for preventing jamming of the gears during operation and for ensuring meshing of the gears at their normal pitch line, and the provision of means capable of accomplishing the foregoing and at the same time providing for a reduction in strains and wear on various of the motor parts.

How the foregoing, together with other objects and advantages are obtained will be clear from a consideration of the following description taken with the accompanying drawings which illustrate the preferred embodiment of the invention, and in which:

Figure 2 is a fragmentary top view, more particularly illustrating the driving mechanism, with certain parts broken away and shown in section for the sake of clarity;

Figure 4 is a somewhat diagrammatic fragmentary view of a cushioning device which I may employ.

Figure 1:
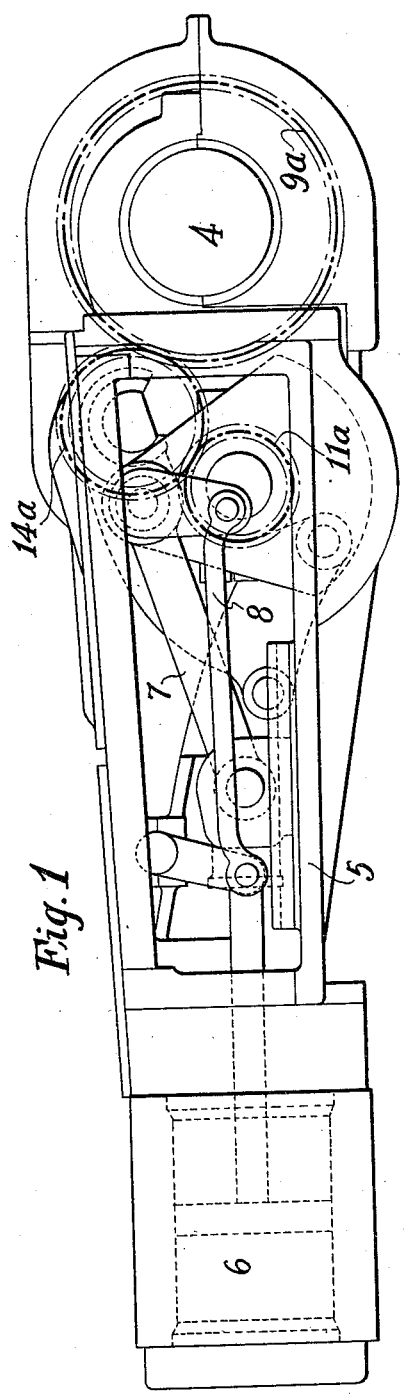
Figure 1 is a somewhat diagrammatic side view of a booster motor with my improvements applied thereto.

Referring now to the drawings, particularly Figure 1, the booster motor is shown as being associated with the load carrying axle indicated at 4. The casting or bed plate 5 constitutes a support for the booster motor and its associated parts including the cylinders indicated by the reference number 6, the cranks 7, and the valve mechanism 8.

Figure 3:
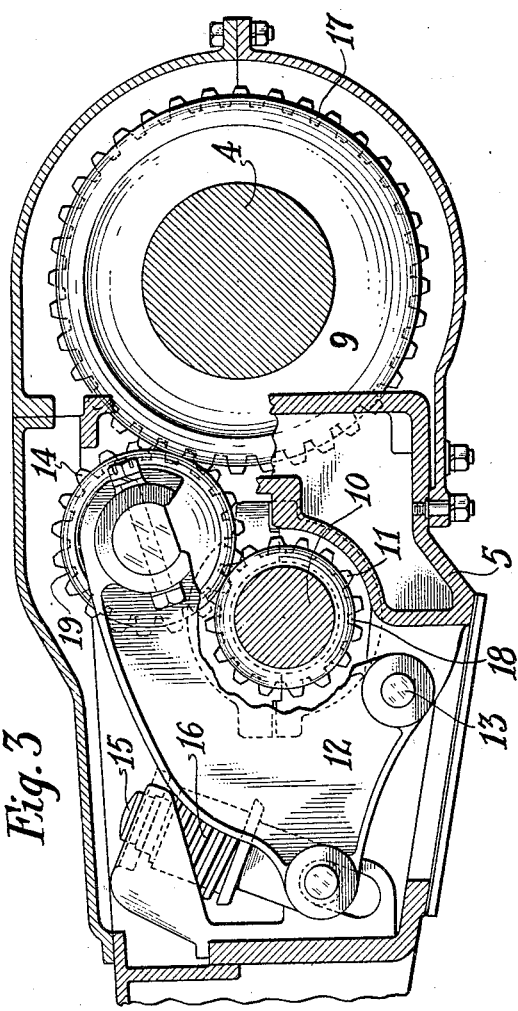
Figure 3 is a fragmentary sectional view taken substantially as indicated by the line 3—3 of Figure 2.

By referring more particularly to Figures 2 and 3, it will be seen that the driving axle 4 is provided with a gear 9 and that the crank shaft 10 is provided with a gear 11, the same constituting the driving gear. The clutch or entraining mechanism establishing a driving connection between the gears 11 and 9 includes a forked rocker member 12 which is suitably pivoted as at 13 to the bed plate 5 and which carries the idler or entraining gear 14, the said gear being rotatably mounted on the fixed shaft 20. The cylinder and piston operating mechanism indicated at 15 serves to swing the forked member 12 and thus establish the operating connection between the driving gear 11 and the driven gear 9. A coil spring 16 serves to disentrain the gear 14.

According to my invention each one of the gears 9, 11 and 14 is provided with stop means in the nature of circumferentially extending shrouds which are adapted to cooperate when the gears are in entrained position in order to prevent the gears from jamming or meshing beyond their normal pitch line. The normal pitch lines of the three gears are indicated in Figure 1 by the heavy dot and dash lines 9a, 11a, and 14a. Each one of the gears is preferably provided with shrouds arranged and carried at each side thereof, the shrouds associated with the gear 9 being indicated at 17, those associated with the gear 11 being indicated at 18 and those associated with the gear 14 being indicated at 19 (see Figure 2).

As will be apparent from the sectional showing of the gear 9 at the right of Figure 2, the shrouds are in the nature of annular rings or collars suitably secured to the gears at the edges thereof. In the preferable arrangement the shrouds associated with each of the gears are struck or turned so that their peripheries coincide with the normal pitch line of the carrying gear.

It should also be observed that, if desired, one or more of the shrouds may be omitted, in which case suitable abutments may be arranged and supported independently of the gears in such position as to cooperate with the remaining shroud or shrouds to prevent jamming.

I may also employ resilient means in the nature of the stop 21 supported by the spring 22 (see Fig. 4) for absorbing or cushioning shocks to the gear shrouds when entrainment is effected. As will be apparent from inspection of Figure 4 this resilient stop mechanism is carried by a portion of the supporting frame 23, the same being provided with a cup 24 adapted to receive the spring 22. The stop 21 is positioned to contact with the flatted side 25 of the fixed shaft 20.

When the entraining mechanism is actuated to move the gear 14 into mesh with the gears 9 and 11 the shrouds 19 contact with those numbered 17 and 18 with the result that meshing beyond the normal pitch line of the gears by an abnormal movement of the rocker 12 or by the thrust incident to the operation of the gears is positively prevented. The resilient stop or cushioning mechanism eliminates excessive shocks to the shrouds. Wear on the gears is thus materially reduced and at the same time all strain on the pivot pin 13 is eliminated. It might also be noted that the arrangement is particularly simple and compact and is therefore, in view of the space limitations necessarily imposed upon booster motor parts, of particular advantage in the construction and maintenance of such booster motors.

I claim:—

1. In a locomotive booster motor, a load carrying axle, a gear on the axle, gear means operated by the motor and driving the axle gear, entraining means for the gearing and positively acting stop means for controlling the degree of meshing between gears and resilient means associated therewith for absorbing shocks at the stop means.

2. In a locomotive booster motor, including a supporting structure therefor, a load carrying axle, a gear on the axle, a second gear having movable mounting means for effecting entrainment and disentrainment of said gears, means for actuating the mounting means to effect entrainment, spring means for actuating the mounting means to effect disentrainment, and resilient means positioned in the path of movement of said mounting means for absorbing shocks of entrainment, the resilient means including a spring supported device adapted to cooperate with said movable mounting means, and the spring reaction being against a portion of the motor supporting structure.

In testimony whereof I have hereunto signed my name.

FRANK RICHARD PETERS.